US012398867B2

(12) United States Patent
Hu

(10) Patent No.: US 12,398,867 B2
(45) Date of Patent: Aug. 26, 2025

(54) DECORATIVE LAMP ASSISTING IN HANGING AND POSITIONING

(71) Applicant: Dongguan Well Run Electrical Appliance Co., Ltd., Dongguan (CN)

(72) Inventor: Yuhui Hu, Dongguan (CN)

(73) Assignee: Dongguan Well Run Electrical Appliance Co., Ltd., Dongguan (CN)

( * ) Notice: Subject to any disclaimer, the term of this patent is extended or adjusted under 35 U.S.C. 154(b) by 0 days.

(21) Appl. No.: 18/922,347

(22) Filed: Oct. 21, 2024

(65) Prior Publication Data

US 2025/0043941 A1 Feb. 6, 2025

(30) Foreign Application Priority Data

Sep. 25, 2024 (CN) ........................ 202422339695.8

(51) Int. Cl.

*F21V 21/008* (2006.01)
*F21S 4/10* (2016.01)
*F21V 21/08* (2006.01)
*F21V 23/00* (2015.01)

(52) U.S. Cl.

CPC ............ *F21V 21/08* (2013.01); *F21V 21/008* (2013.01); *F21V 23/002* (2013.01); *F21S 4/10* (2016.01)

(58) Field of Classification Search

CPC ......... F21V 21/008; F21V 23/002; F21S 4/10
See application file for complete search history.

(56) References Cited

U.S. PATENT DOCUMENTS 10,900,656 B1 * 1/2021 Wang ........................ F21V 3/00
12,072,081 B1 * 8/2024 Martini ................ F21V 21/008
2008/0170401 A1 7/2008 Li
2009/0067197 A1 3/2009 Shao
2011/0051434 A1 3/2011 Lin

FOREIGN PATENT DOCUMENTS

CN 104064882 A * 9/2014

* cited by examiner

*Primary Examiner* — Sean P Gramling
(74) *Attorney, Agent, or Firm* — Hemisphere Law, PLLC; Zhigang Ma

(57) ABSTRACT

The present disclosure belongs to the technical field of lamps, in particular to a decorative lamp assisting in hanging and positioning. The decorative lamp assisting in hanging and positioning includes a lamp holder and a lamp bulb electrically connected with the lamp holder, and also includes a wire holder and a main power cord. The main power cord passes through the wire holder from one end of the wire holder to the other end of the wire holder, and the main power cord is electrically connected with the lamp holder. A hanging hole is formed in the top of the wire holder in a first direction, an assistance hole is formed in the top of the wire holder in a second direction, and a central axis of the assistance hole is parallel to the main power cord transversely passing through the lamp holder.

3 Claims, 4 Drawing Sheets

DECORATIVE LAMP ASSISTING IN HANGING AND POSITIONING

TECHNICAL FIELD

The present disclosure relates to the technical field of lamps, in particular to a decorative lamp assisting in hanging and positioning.

BACKGROUND

The colored light string often used in outdoor entertainment gathering places and family courtyards is a low-cost and beautiful decorative lamp.

The Chinese patent CN201520392385.0 discloses an outdoor lamp string. The outdoor lamp string includes a plurality of groups of lamp string units, wherein each group of lamp string units includes a power cord, a plurality of lamp holders arranged on the power cord and electrically connected with the power cord, and bulbs mounted on the lamp holders. The existing lamps are the same as those disclosed above in structures. Only a single hanging hole is formed in the upper part of the lamp holder. When the lamp hangs outdoors, the lamp can only be positioned in a single direction through the hanging hole, but objects exactly suitable for hanging cannot be found in all outdoor environments, and the lamp cannot be hung at a required specific angle at this time, resulting in affected decorative effect of the lamp. If a hanging wire is temporarily mounted, spare labor cost and inconvenience to the use of the lamp are caused, so further optimization is needed.

SUMMARY

In view of the above-mentioned shortcomings and disadvantages in the prior art, the present disclosure provides a decorative lamp assisting in hanging and positioning, which solves the technical problem of limited hanging of outdoor lamps.

In order to achieve the above-mentioned purpose, the present disclosure provides a lamp panel plug-in type LED (Light Emitting Diode) lamp bulb. The lamp includes a lamp holder and a lamp bulb electrically connected with the lamp holder. The lamp bulb at least includes a bulb shell and a lamp wick assembly used for giving out light, and the lamp wick assembly extends into the bulb shell. The decorative lamp also includes a wire holder and a main power cord, the main power cord passes through the wire holder from one end of the wire holder to the other end of the wire holder, and the main power cord is electrically connected with the lamp holder. A hanging hole is formed in the top of the wire holder in a first direction, an assistance hole is formed in the top of the wire holder in a second direction, and a central axis of the assistance hole is parallel to the main power cord transversely passing through the lamp holder.

Preferably, the wire holder and the lamp holder are integral through injection molding.

Preferably, the wire holder and the lamp holder are formed in a split type. The lamp also includes a branched power cord. One end of the branched power cord is electrically connected with the lamp holder, and the other end of the branched power cord extends into the wire holder and is electrically connected with the main power cord.

Preferably, the central axis of the assistance hole and a central axis of the hanging hole are vertical to each other.

Preferably, the assistance hole is equipped with an anti-skid plug used for increasing frictional force; and a through hole for an assistance wire to pass through is formed in the middle of the anti-skid plug.

Preferably, the anti-skid plug is in the shape of a circular truncated cone, and the through hole extends to a lower bottom surface of the anti-skid plug from an upper bottom surface of the anti-skid plug.

Preferably, the middle part of the through hole is provided with a plurality of telescopic components, and the telescopic components are surrounded to form a telescopic wire hole.

The present disclosure has the following beneficial effects. Compared with the prior art, the present disclosure is a lamp fixture. The present disclosure has the following advantages. Firstly, besides the conventional hanging hole formed in the wire holder, the assistance hole is also formed in the direction of the main power cord. The assistance hole and the hanging hole are used cooperatively, so that the lamp hangs outdoors more conveniently to enlarge the application range of the lamp. Secondly, the lamp can hang outdoors at a specific angle without additionally setting up wood piles, so that more human cost is saved. Thirdly, the assistance hole of the lamp is equipped with the anti-skid plug, so that lamp positioning is facilitated.

REFERENCE SIGNS IN ATTACHED FIGURES

1, lamp holder; 2, lamp bulb; 21, bulb shell; 22, lamp wick assembly; 3, wire holder; 31, hanging hole; 32, assistance hole; 4, main power cord; 5, branched power cord; 7, anti-skid plug; 71, through hole; 72, telescopic component; and 73, telescopic wire hole.

DETAILED DESCRIPTION OF THE EMBODIMENTS

Figure 1:
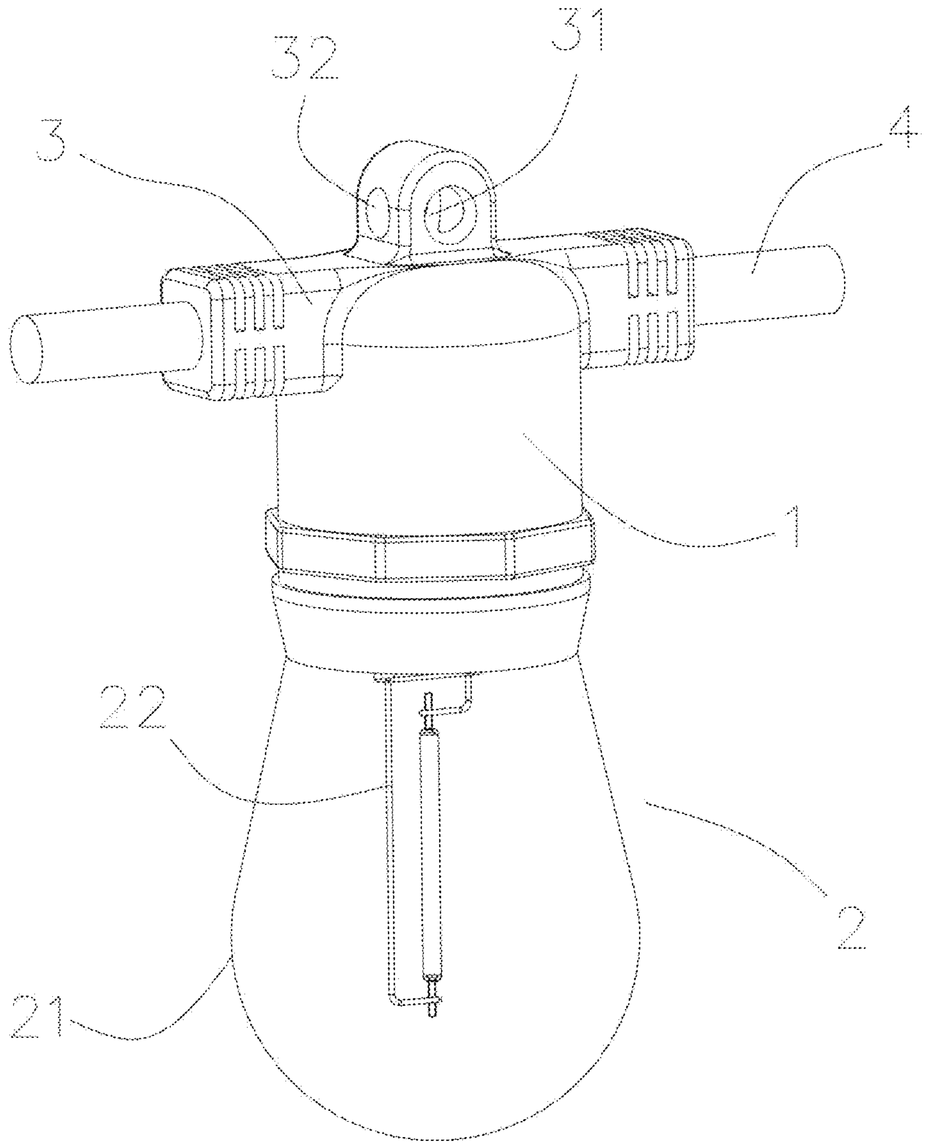
FIG. 1 is an integral structural schematic diagram of the present disclosure.
Figure 2:
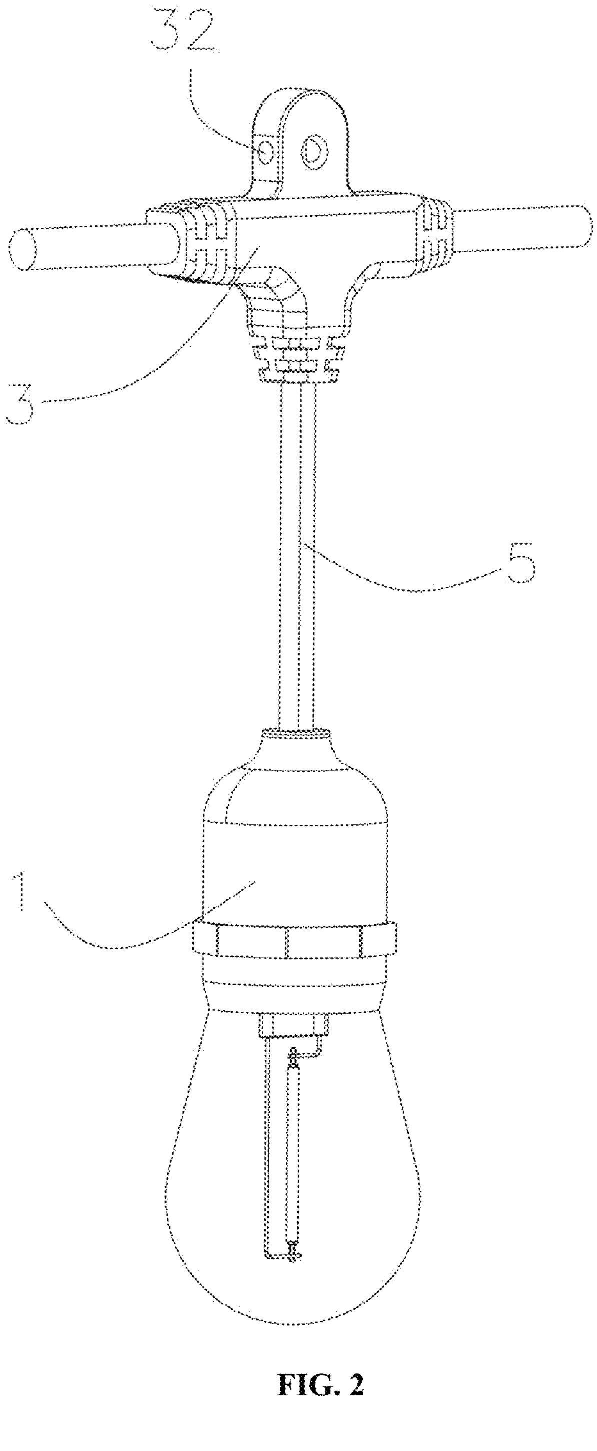
FIG. 2 is an integral structural schematic diagram of the present disclosure with a branched power cord.
Figure 3:
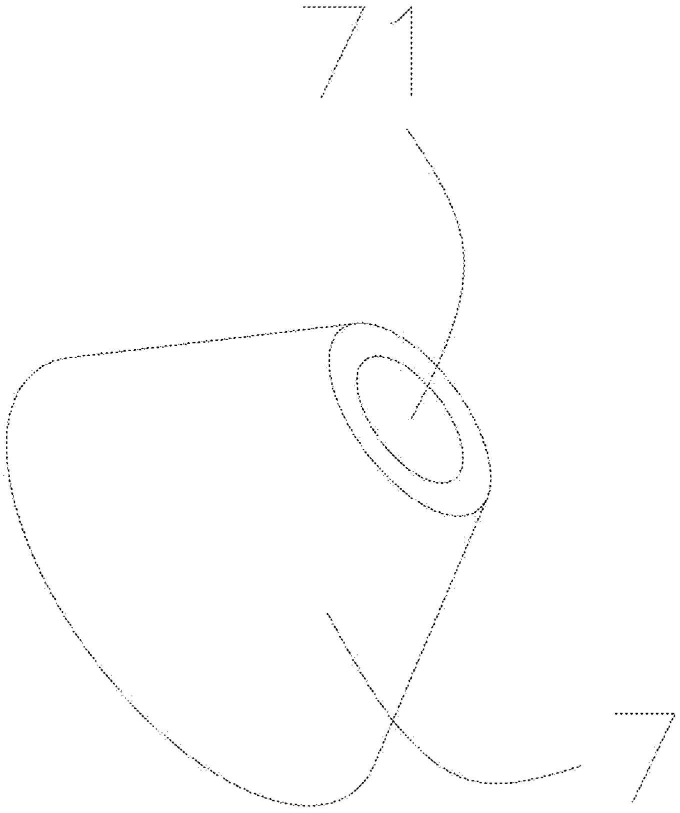
FIG. 3 is a structural schematic diagram of an anti-skid plug in one embodiment of the present disclosure.
Figure 4:
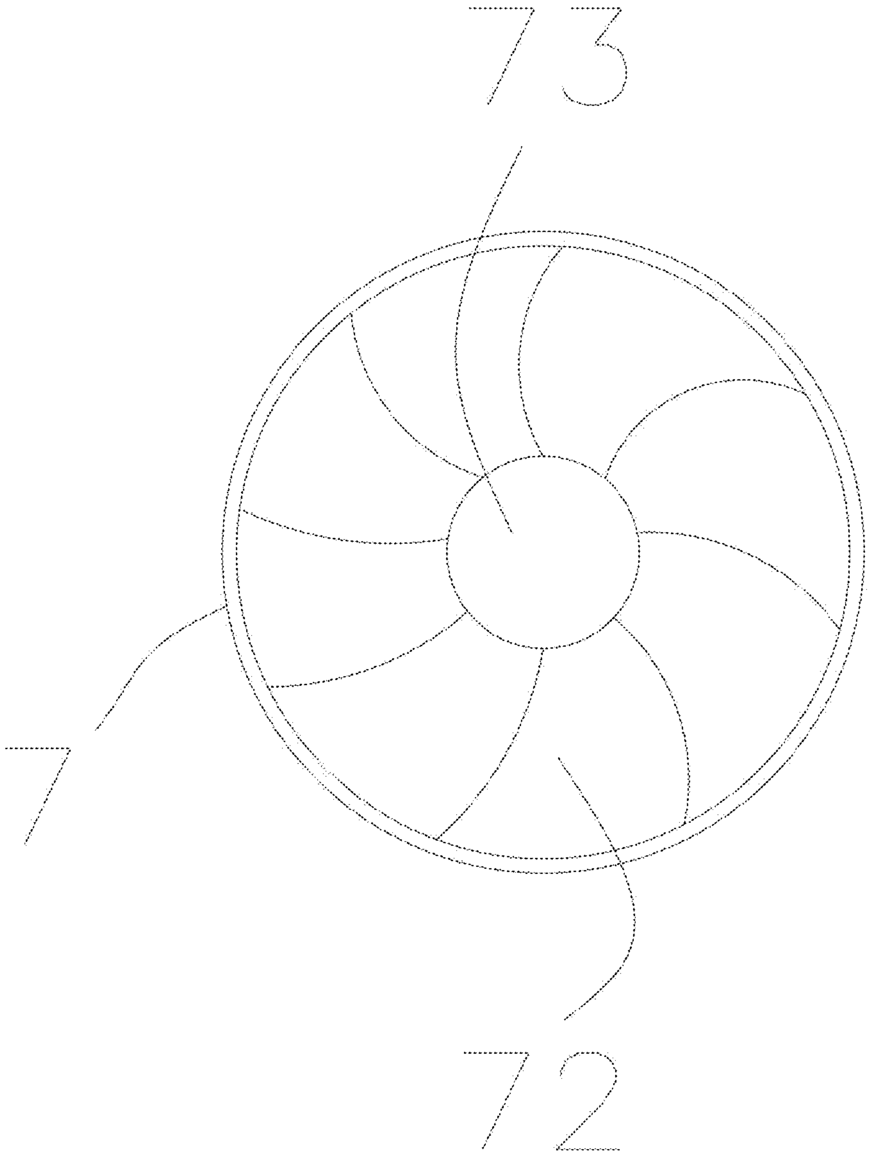
FIG. 4 is a structural schematic diagram of an anti-skid plug in another embodiment of the present disclosure.

The present disclosure is further described in detail in conjunction with the attached figures of FIG. 1 to FIG. 4.

A decorative lamp assisting in hanging and positioning proposed by the embodiment of the present disclosure includes a lamp holder 1 and a lamp bulb 2 electrically connected with the lamp holder 1. The lamp bulb 2 at least includes a bulb shell 21 and a lamp wick assembly 22 used for giving out light, and the lamp wick assembly 22 extends into the bulb shell 21. The decorative lamp also includes a wire holder 3 and a main power cord 4, the main power cord 4 passes through the wire holder 3 from one end of the wire holder 3 to the other end of the wire holder 3, and the main power cord 4 is electrically connected with the lamp holder 1. A hanging hole 31 is formed in the top of the wire holder 3 in a first direction, an assistance hole 32 is formed in the top of the wire holder in a second direction, and a central axis of the assistance hole 32 is parallel to the main power cord 4 transversely passing through the lamp holder 1.

In the present disclosure, besides the conventional lamp hanging hole 31 formed in the wire holder 3, the assistance hole 32 is also formed in the direction parallel to the main power cord, so that the lamp can realize multidirectional hanging, and the lamp hangs outdoors without the restriction of environments. The lamp hangs without setting up wood piles any more, so that the application range of the lamp is enlarged.

As one embodiment, as shown in figures, the wire holder 3 and the lamp holder 1 are integral through injection molding. Through the embodiment, corresponding raw materials can be saved at the joint of the wire holder 3 and the lamp holder 1, and at the same time, the forming process of the lamp is simplified. Of course, in the embodiment, the wire holder 3 may be directly omitted, and the lamp holder 1 is directly electrically connected with the main power cord 4.

As another embodiment, as shown in figures, the wire holder 3 and the lamp holder 1 are formed in a split type. The lamp also includes a branched power cord 5. One end of the branched power cord 5 is electrically connected with the lamp holder 1, and the other end of the branched power cord 5 extends into the wire holder 3 from the bottom of the wire holder 3 and is electrically connected with the main power cord 4. In the embodiment, hanging decoration is realized through the branch power cord 5 between the lamp and the wire holder 3, so that the decorativeness of the lamp is effectively improved.

Optionally, the assistance hole 32 and the hanging hole 31 are connected with each other, and the central axis of the assistance hole 32 and a central axis of the hanging hole 31 are vertical to each other, that is, a cross-shaped through hole 71 is formed in the wire holder 3, so that the assistance hole 32 and the hanging hole 31 can be used cooperatively.

In order to facilitate the positioning of the lamp, the assistance hole 32 is equipped with an anti-skid plug 7 used for increasing frictional force. A through hole 71 for an assistance wire to pass through is formed in the middle of the anti-skid plug 7. The hole diameter of the through hole 71 is smaller than that of the assistance hole 32 and equivalent to the wire diameter of the assistance wire. Therefore, when the assistance hole 32 is equipped with the anti-skid plug 7, the frictional force between the assistance hole 32 and the assistance wire is greatly increased, and the lamp is not prone to slide and move, so that lamp positioning can be realized at low cost.

Optionally, as shown in figures, the anti-skid plug 7 is in the shape of a circular truncated cone, and the through hole 71 extends to a lower bottom surface of the anti-skid plug 7 from an upper bottom surface of the anti-skid plug 7. In the embodiment, the anti-skid plug 7 in the shape of a circular truncated cone has both ends of different sizes, and the anti-skid plug 7 can be smoothly clamped into the assistance hole 32 with a small-diameter end.

As another embodiment, as shown in figures, the middle part of the through hole 71 is provided with a plurality of telescopic components 72, and the telescopic components 72 are surrounded to form a telescopic wire hole 73. In the embodiment, the through hole 71 of the anti-skid plug 7 is converted into the elastic telescopic wire hole 73, so that the anti-skid plug 7 can accommodate the assistance wire within a certain wire diameter range, and the anti-skid plug 7 of one size does not need to be replaced due to the change of the assistance wire, and the application range of the anti-skid plug 7 is further enlarged under the function of ensuring the lamp positioning of the anti-skid plug 7.

The foregoing is merely a preferred embodiment of the present disclosure, those skilled in the art can make various modifications in terms of specific embodiments and scope of application in accordance with the thoughts of the present disclosure, and the details of the description should not interpreted as the limitation of the present disclosure.

What is claimed is:

1. A decorative lamp assisting in hanging and positioning, comprising a lamp holder (1) and a lamp bulb (2) electrically connected with the lamp holder (1), wherein the lamp bulb (2) at least comprises a bulb shell (21) and a lamp wick assembly (22) used for giving out light, and the lamp wick assembly (22) extends into the bulb shell (21); the decorative lamp also comprises a wire holder (3) and a main power cord (4), the main power cord (4) passes through the wire holder (3) from one end of the wire holder (3) to the other end of the wire holder (3), and the main power cord (4) is electrically connected with the lamp holder (1); and a hanging hole (31) is formed in the top of the wire holder (3) in a first direction, an assistance hole (32) is formed in the top of the wire holder in a second direction, and a central axis of the assistance hole (32) is parallel to the main power cord (4) transversely passing through the lamp holder (1);

wherein the assistance hole (32) is equipped with an anti-skid plug (7) used for increasing frictional force; and a through hole (71) for an assistance wire to pass through is formed in the middle of the anti-skid plug (7);

wherein the middle part of the through hole (71) is provided with a plurality of telescopic components (72), and the telescopic components (72) are surrounded to form a telescopic wire hole (73).

2. The decorative lamp assisting in hanging and positioning according to claim 1, wherein the central axis of the assistance hole (32) and a central axis of the hanging hole (31) are vertical to each other.

3. The decorative lamp assisting in hanging and positioning according to claim 1, wherein the anti-skid plug (7) is in the shape of a circular truncated cone, and the through hole (71) extends to a lower bottom surface of the anti-skid plug (7) from an upper bottom surface of the anti-skid plug (7).

* * * * *